(12) United States Patent
Cao

(10) Patent No.: US 12,199,712 B2
(45) Date of Patent: Jan. 14, 2025

(54) STATION, AP, METHOD FOR FEEDING BACK CHANNEL STATE INFORMATION, BEAM FORMING METHOD, AND STORAGE MEDIUM

(71) Applicant: SPREADTRUM COMMUNICATIONS (SHANGHAI) CO., LTD., Shanghai (CN)

(72) Inventor: Mingwei Cao, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 105 days.

(21) Appl. No.: 18/028,965

(22) PCT Filed: Aug. 25, 2021

(86) PCT No.: PCT/CN2021/114441
§ 371 (c)(1),
(2) Date: Mar. 28, 2023

(87) PCT Pub. No.: WO2022/062810
PCT Pub. Date: Mar. 31, 2022

(65) Prior Publication Data
US 2024/0030973 A1    Jan. 25, 2024

(30) Foreign Application Priority Data
Sep. 28, 2020   (CN) .......................... 202011041109.1

(51) Int. Cl.
*H04B 7/06*    (2006.01)
*H04B 7/0456*  (2017.01)

(52) U.S. Cl.
CPC ......... *H04B 7/0617* (2013.01); *H04B 7/0456* (2013.01); *H04B 7/0626* (2013.01)

(58) Field of Classification Search
CPC ... H04B 7/0617; H04B 7/0456; H04B 7/0626
See application file for complete search history.

(56) References Cited

U.S. PATENT DOCUMENTS 10,181,890 B2   1/2019  Su
11,108,442 B1*  8/2021  Tian ...................... H04B 17/12
(Continued)

FOREIGN PATENT DOCUMENTS

CN   1457204 A    11/2003
CN   101820334 A   9/2010
(Continued)

OTHER PUBLICATIONS

International Search Report for corresponding International Application No. PCT/CN2021/114441; Mailing Date, Nov. 16, 2021.

*Primary Examiner* — Sophia Vlahos
(74) *Attorney, Agent, or Firm* — CANTOR COLBURN LLP

(57) ABSTRACT

A station is provided, including: a receiving and processing circuit, configured to obtain signal power of a plurality of training frames on a plurality of receiving antennas by processing the plurality of training frames; and a combination circuitry, configured to generate channel state information, the channel state information including a first correspondence, the signal power of the plurality of training frames, and unitary arrays and singular value matrixes, wherein the unitary arrays and the singular value matrixes are associated with equivalent channel matrixes corresponding to the plurality of training frames, the first correspondence includes a correspondence between the signal power and noise figures, and the noise figures are associated with gain values of the receiving and processing circuit.

20 Claims, 1 Drawing Sheet

(56) References Cited

U.S. PATENT DOCUMENTS

| | | |
|---|---|---|
| 2004/0203983 A1 | 10/2004 | Klomsdorf et al. |
| 2009/0067402 A1 | 3/2009 | Forenza et al. |
| 2009/0286563 A1* | 11/2009 | Ji .................. H04W 48/20 |
| | | 455/501 |
| 2010/0008247 A1* | 1/2010 | Kwon ............... H04L 43/16 |
| | | 370/252 |
| 2011/0075752 A1 | 3/2011 | Zheng et al. |
| 2012/0113816 A1* | 5/2012 | Bhattad ......... H04L 25/0226 |
| | | 370/246 |
| 2012/0269077 A1 | 10/2012 | Bazzi et al. |
| 2012/0314791 A1* | 12/2012 | Zhang ............... H04B 7/063 |
| | | 375/267 |

FOREIGN PATENT DOCUMENTS

| | | |
|---|---|---|
| CN | 103297102 A | 9/2013 |
| CN | 104796220 A | 7/2015 |
| CN | 105722016 A | 6/2016 |
| CN | 106028434 A | 10/2016 |
| CN | 106209195 A | 12/2016 |
| CN | 112152685 A | 12/2020 |
| EP | 2515495 A1 | 10/2012 |

\* cited by examiner

STATION, AP, METHOD FOR FEEDING BACK CHANNEL STATE INFORMATION, BEAM FORMING METHOD, AND STORAGE MEDIUM

CROSS REFERENCE TO RELATED APPLICATIONS

This is the U.S. national stage of application No. PCT/CN2021/114441, filed on Aug. 25, 2021. Priority under 35 U.S.C. § 119(a) and 35 U.S.C. § 365(b) is claimed from Chinese Application No. 202011041109.1, filed Sep. 28, 2020, the disclosure of which is also incorporated herein by reference.

TECHNICAL FIELD

The present disclosure generally relates to communication technology field, and more particularly, to a method for feeding back Channel State Information (CSI), a beam forming method, an Access Point (AP), a station and a storage medium.

BACKGROUND

In current WiFi systems, Orthogonal Frequency Division Multiplexing (OFDM) technology is used to improve spectral efficiency. With the application of Multiple-In Multiple Out (MIMO) technology, space multiplexing is further explored to improve spectral efficiency. To support MIMO, transmitters usually have multiple transmitting antennas, which makes beam forming possible.

To support beam forming to achieve better multi-antenna transmission performance, a
wireless Access Point requires a station to feedback CSI. A channel fed back by CSI refers to an equivalent channel which is obtained by applying influence of a circuit of an AP transmitter and a station receiver on a transmitting signal to a spatial channel through which the transmitting signal passes.

In order to facilitate the feedback of CSI, the wireless AP may send a training frame to the station. When the station receiver receives the training frame, the station receiver may estimate an equivalent channel corresponding to the training frame, and feedback an estimation result of the equivalent channel to the wireless AP through the CSI. The wireless AP performs precoding and beam forming based on the CSI corresponding to the training frame.

SUMMARY

Embodiments of the present disclosure may improve effect of beam forming.

An embodiment of the present disclosure provides a station including: a receiving and processing circuit, configured to obtain signal power of a plurality of training frames on a plurality of receiving antennas by processing the plurality of training frames; and a combination circuitry, configured to generate channel state information, the channel state information including a first correspondence, the signal power of the plurality of training frames, and unitary arrays and singular value matrixes, wherein the unitary arrays and the singular value matrixes are associated with equivalent channel atr xes corresponding to the plurality of training frames, the first correspondence includes a correspondence between the signal power and noise figures, and the noise figures are associated with gain values of the receiving and processing circuit.

An embodiment of the present disclosure further provides a method for feeding back channel state information, being applied to a station which includes a receiving and processing circuit, and including: obtaining signal power of a plurality of training frames on a plurality of receiving antennas by processing the plurality of training frames; and generating the channel state information, the channel state information including a first correspondence, the signal power of the plurality of training frames, and unitary arrays and singular value matrixes, wherein the unitary arrays and the singular value matrixes are associated with equivalent channel matrixes corresponding to the plurality of training frames, the first correspondence includes a correspondence between the signal power and noise figures, and the noise figures are associated with gain values of the receiving and processing circuit.

An embodiment of the present disclosure also provides a computer-readable storage medium having a computer program stored thereon, wherein the computer program is executed by a processor to perform the above-described method.

DETAILED DESCRIPTION

In order to make the above objectives, features and advantages of the disclosure more obvious and understandable, specific embodiments of the disclosure are described in detail in combination with the drawings.

In order to facilitate a station feeding back CSI, an AP may send a training frame to help the station to estimate the CSI. The CSI refers to state information of an equivalent channel. The equivalent channel refers to a channel obtained by applying influence of a circuit of an AP transmitter and a station receiver on a signal to a spatial channel through which the transmitting signal passes.

Specifically, a circuit of an existing station receiver includes parts such as receiving antennas and a radio frequency circuit. An input signal on a same receiving antenna may have different signal power according to different actual scenes, and input signals on different receiving antennas may also have different signal power. The radio frequency circuit mainly includes a signal amplifier part and a mixing part, which can convert the input signals on the receiving antennas into base-band signals. The amplifier part of the radio frequency circuit mainly includes a Low Noise Amplifier (LNA) and a Variable Gain Amplifier (VGA).

Figure 1:
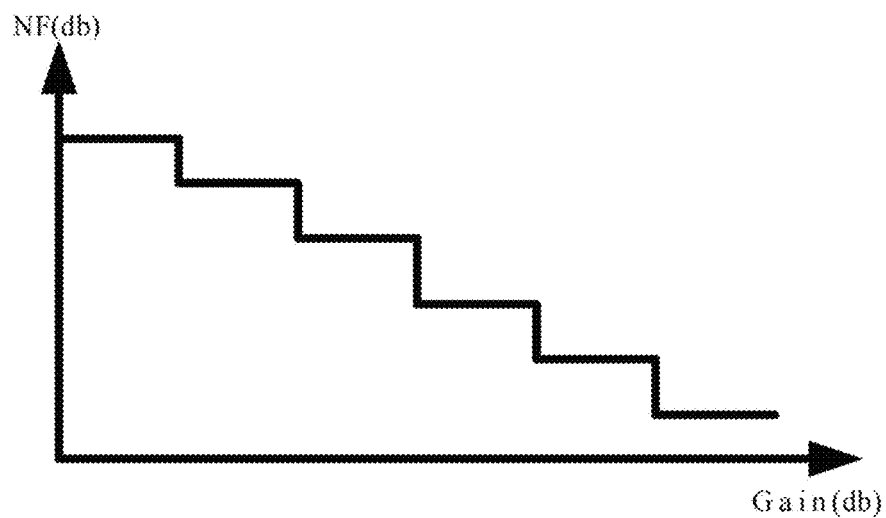
FIG. 1 is a diagram of a relation between gains and noise figures.

A dynamic range of the station receiver is relatively wide, as small as possibly a signal of −100 dbm, as large as possibly a signal of 10 dbm. A gain value of radio frequency circuit mainly depends on a gain of the LNA. To facilitate understanding, only LNA is analyzed below. As shown in FIG. 1, the LNA is usually provided with multiple gains. The larger the gain is, the smaller the linear range is, and the smaller the Noise Figure (NF) is. When the station estimates a channel, the LNA coupled with different receiving antennas may use different gains, i.e., having different NFs. This makes the equivalent channel obtained by applying the radio frequency circuit on the spatial channel change with NF, while the channel estimated by the station receiver is exactly the equivalent channel.

Due to effect of Beam Forming (BF), when the station receives the training frame and a data frame, signal power of the training frame and the data frame on the receiving antennas is different, making the gains used by the LNA probably different. Take two receiving antennas as an example. The signal power of the training frame on the two receiving antennas may be −50 dbm and −60 dbm, respectively. After the AP performs BF, the signal power of the data frame on the two receiving antennas may be −55 dbm and −55 dbm, respectively. This enables the radio frequency circuit coupled with the two receiving antennas to use different gains when the station receives the training frame and the data frame, thus having different noise figures, i.e., the signal power of the input signal on the receiving antennas has the corresponding noise figure, and an equivalent channel corresponding to the training frame and an equivalent channel corresponding to the data frame are different.

Figure 2:
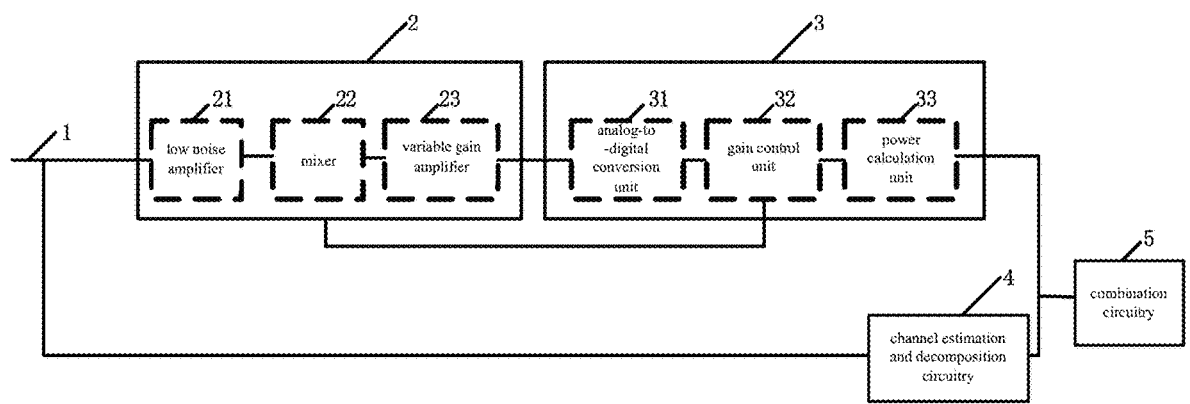
FIG. 2 is a structural diagram of a station according to an embodiment of the present disclosure.

Based on the above research, the applicant proposes a new station structure. As shown in FIG. 2, the station of an embodiment of the present disclosure includes a receiving and processing circuit and a combination circuitry 5. The receiving and processing circuit is a main component of the station receiver.

The receiving and processing circuit is configured to obtain signal power of a plurality of training frames on a plurality of receiving antennas 1 by processing the plurality of training frames.

The combination circuitry 5 is configured to generate CSI, the CSI including a first correspondence, the signal power of the training frames, and unitary arrays V(k) and singular value matrixes S(k), k indicates a k-th subcarrier, wherein the unitary arrays V(k) and the singular value matrixes S(k) are associated with equivalent channel matrixes H(k) corresponding to the training frames, the first correspondence includes a correspondence between the signal power and noise figures, and the noise figures are associated with gain values of the receiving and processing circuit.

From above, the station in the embodiments disposes the signal power of the plurality of training frames and the correspondence between the signal power and the noise figures into the CSI. Therefore, in this new CSI, in addition to the conventional unitary arrays V(k) and the singular value matrixes S(k), the signal power of the training frames and the correspondence between the signal power and the noise figures is also included. This provides a basis for the AP to update a precoding scheme based on the new CSI, which may greatly improve effect of beam forming.

A structure of the station is explained in detail below.

The receiving and processing circuit includes a radio frequency circuit 2 and a processing circuitry 3.

The radio frequency circuit 2 is configured to generate base-band signals by processing training frames on a plurality of receiving antennas 1, and gain values of the radio frequency circuit 2 are associated with gain values of the receiving and processing circuit. Specifically, the radio frequency circuit 2 may generate the base-band signals by performing signal amplification and mixing processing on the training frames.

Optionally, the radio frequency circuit 2 includes a low noise amplifier 21, a mixer 22, and a variable gain amplifier 23, wherein the gain values of the radio frequency circuit 2 are associated with gain values of the low noise amplifier 21 and the variable gain amplifier 23.

An input terminal of the low noise amplifier 21 is configured to receive the training frames, and an output terminal of the low noise amplifier 21 is coupled to an input terminal of the mixer 22. The mixer 22 is configured to mix signals received at an input terminal of the mixer 22 and output mixed signals through an output terminal of the mixer 22. The mixer 22 may move center frequency of the signals from radio frequency to zero frequency. An input terminal of the variable gain amplifier 23 is coupled to the output terminal of the mixer 22, and an output terminal of the variable gain amplifier 23 is configured to output base-band signals.

The processing circuitry 3 is configured to obtain the signal power of the training frames according to the base-band signals and the gain values of the radio frequency circuit 2, and the signal power of the training frames corresponds to numbers of the receiving antennas. The processing circuitry 3 includes an analog-to-digital conversion unit 31, a gain control unit 32, and a power calculation unit 33.

The analog-to-digital conversion unit 31 is configured to generate digital signals by performing analog-to-digital conversion on the base-band signals. The gain control unit 32 is configured to adjust the gain values of the radio frequency circuit 2 and transmit the adjusted gain values to the power calculation unit 33. The power calculation unit 33 may calculate power of the digital signals corresponding to the base-band signals. The power calculation unit 33 calculates the signal power of the training frame on a receiving antenna 1 based on the power of the calculated digital signals and the gain values transmitted by the gain control unit 32.

The gain control unit 32 may be connected with the low noise amplifier 21 and the variable gain amplifier 23 to adjust gain values thereof, and the low noise amplifier 21 and the variable gain amplifier 23 may perform signal amplification the training frames based on the gain values adjusted by the gain control unit 32. The gain control unit 32 may be an Automatic Gain Control (AGC) circuit. It is understood that the gain values of the noise amplifier 21 and the variable gain amplifier 23 actually represent the gain values of the radio frequency circuit 2.

The station in the embodiments also includes a channel estimation and decomposition circuitry 4. An OFDM system generally has several subcarriers, and the channel estimation and decomposition circuitry 4 may decompose the equivalent channel matrixes H(k) of the training frames on each subcarrier to obtain the unitary arrays V(k) and the singular value matrixes S(k).

Taking a system including an AP with two transmitting antennas and a station with two receiving antennas as an example, the equivalent channel matrix H(k) on a k-th subcarrier may be expressed as:

$$H(k) = \begin{bmatrix} H_{11} & H_{21} \\ H_{12} & H_{22} \end{bmatrix}$$

where Hji is the equivalent channel matrix from a j-th transmitting antenna in the AP to an i-th receiving antenna in the station.

The equivalent channel matrix H(k) may be decomposed as follows:

$$H(k) \rightarrow SVD \rightarrow U(k)S(k)v^{-1}(k) \qquad \text{formula 1}$$

$$S(k) = \text{diag}(S_1(k), S_2(k), \dots)$$

where SVD represents SVD decomposition, U(k) and V(k) are the unitary arrays, S(k) is the singular value matrix, S1(k), S2(k) and etc are singular values, diag represents a diagonal array whose diagonal elements are S1(k), S2(k) and etc.

The combination circuitry 5 combines the signal power of the training frames, the correspondence between the signal power and the noise figures, and the unitary arrays V(k) and the singular value matrixes S(k) as the CSI for feedback to the AP. Specifically, the correspondence between the signal power and the noise figures may be generated based on specifications of the radio frequency circuit or parameters of related test circuits, and pre-stored in the combination circuitry 5. The correspondence between the signal power and the noise figures may be generated by those skilled in the art according to actual needs.

An embodiment of the present disclosure also provides a method for feeding back channel state information, including S11 and S12.

In S1, a receiving and processing circuit obtains signal power of a plurality of training frames on a plurality of receiving antennas by processing the plurality of training frames.

In S2, the receiving and processing circuit generates the channel state information, the channel state information including a first correspondence, the signal power of the plurality of training frames, and unitary arrays and singular value matrixes, wherein the unitary arrays and the singular value matrixes are associated with equivalent channel matrixes corresponding to the plurality of training frames, the first correspondence includes a correspondence between the signal power and the noise figures, and the noise figures are associated with gain values of the receiving and processing circuit.

Specifically, the receiving and processing circuit may include a radio frequency circuit, and S1 may include S11 and S12.

In S11, the radio frequency circuit generates base-band signals by processing the training frames on the receiving antennas;

In S12, the radio frequency circuit obtains the signal power of the plurality of training frames based on the base-band signals and gain values of the radio frequency circuit, wherein the gain values of the radio frequency circuit are associated with the gain values of the receiving and processing circuit.

In S11, the radio frequency circuit generates the base-band signals by performing signal amplification and mixing processing on the plurality of training frames. Specifically, the radio frequency circuit performs signal amplification on the plurality of training frames based on the gain values of the radio frequency circuit.

S12 may include S121, S122 and S123.

In S121, the radio frequency circuit generates digital signals by performing analog-to-digital conversion on the base-band signals.

In S122, the radio frequency circuit adjusts the gain values of the radio frequency circuit.

In S123, the radio frequency circuit calculates power of the digital signals and obtains the signal power of the plurality of training frames based on the power of the digital signals and the gain values of the radio frequency circuit.

In the embodiment, S1 may further include S13.

In S13, the radio frequency circuit adjusts the gain values of the radio frequency circuit.

The method for feeding back the channel state information described in the embodiment may further include S3.

In S3, the receiving and processing circuit decomposes the equivalent channel matrixes of the training frames on each subcarrier to obtain the unitary arrays and singular value matrixes.

The method for feeding back the channel state information in the embodiment corresponds to the structure of the station in the foregoing embodiment, and relevant detailed explanation can be referred to the descriptions of the foregoing embodiment and is not repeated here.

An embodiment of the present disclosure also provides an AP corresponding to the station in the aforementioned embodiment. The AP includes a receiving circuitry, and an updating circuitry.

The receiving circuitry is configured to receive channel state information, the channel state information including a first correspondence, signal power of a plurality of training frames, and unitary arrays V(k) and singular value matrixes S(k), wherein the unitary arrays V(k) and the singular value matrixes S(k) are associated with equivalent channel matrixes H(k) corresponding to the plurality of training frames, the first correspondence includes a correspondence between the signal power and noise figures, and the noise figures are associated with gain values of the receiving and processing circuit in a station.

The updating circuitry is configured to update the channel state information in response to meeting a first condition which includes that the signal power of the plurality of training frames is inconsistent. For example, signal power P1 of the training frame on a first receiving antenna is unequal to signal power P2 of the training frame on a second receiving antenna.

The AP provided in the embodiments is configured to receive the CSI having the first correspondence and the signal power of the training frames and update the CSI when the signal power of multiple training frames is inconsistent, thus improving effect of beam forming.

The AP in the present embodiment may also include a prediction circuitry.

The prediction circuitry is configured to obtain a precoding matrix based on the unitary arrays and the singular value matrixes (which can be regarded as an initial precoding matrix).

The precoding circuitry is configured to update the precoding matrix to obtain an updated precoding matrix based on the updated channel state information in response to meeting the first condition. Using the updated CSI to obtain the updated precoding matrix may improve the effect of beam forming.

A constituent structure of the AP is explained in detail below.

The precoding circuitry updates the precoding matrix according to the signal power of the training frames, signal power of data frames, and the first correspondence. Specifically, the precoding circuitry includes a power acquisition circuitry, a first figure acquisition circuitry, a second figure acquisition circuitry and an updating sub-circuitry.

The power acquisition circuitry is configured to obtain the signal power of the data frames based on the precoding matrix (the initial precoding matrix).

The first figure acquisition circuitry is configured to obtain first noise figures $NF_i$ corresponding to the plurality of training frames based on the signal power $P_i$ of the plurality of training frames and the first correspondence.

The second figure acquisition circuitry is configured to obtain second noise figures $NF_0$ corresponding to the data frames based on the signal power $P_i'$ of the data frames and the first correspondence.

The updating sub-circuitry is configured to update the precoding matrix to obtain an updated precoding matrix based on the first noise figures and the second noise figures in response to meeting the first condition.

Taking an Additive White Gaussian Noise (AWGN) channel as an example, channel fading of all subcarriers is the same, but channel fading of different transmitting antennas to different receiving antennas is independent, thus, the number k of subcarrier can be omitted. Taking a precoding scheme adopted by the AP being a Zero Force (ZF) algorithm as an example, the prediction circuitry may obtain the precoding matrix Q according to the following formula 2:

$$Q = v * S^{-1}/\sqrt{\|VS^{-1}\|^2} \quad \text{formula 2}$$

where $\|\cdot\|^2$ represents a norm, V represents the unitary arrays V(k), and S represents the singular value matrixes S(k).

An implementation method for obtaining the signal power of the data frames according to the precoding matrix Q may be referred to specific examples as follows.

Take a system including an AP with two transmitting antennas and a station with two receiving antennas as an example. The two transmitting antennas of the AP transmit training frames to the station simultaneously, and the training frames are fed to the frequency circuit after being received by the two receiving antennas of the station, and afterward are subjected to processing such as analog-to-digital conversion. A signal that has been subjected to the processing by the station receiver and is disposed on a k-th subcarrier (this signal is representation of the training frames on the k-th subcarrier in a frequency domain) may be expressed as:

$$\begin{bmatrix} r_1(k) \\ r_2(k) \end{bmatrix} = \begin{bmatrix} G_1 \\ G_2 \end{bmatrix} .* \begin{bmatrix} H_{11}(k) & H_{21}(k) \\ H_{12}(k) & H_{22}(k) \end{bmatrix} \begin{bmatrix} s_1(k) \\ s_2(k) \end{bmatrix} + \begin{bmatrix} n_1(k) \\ n_2(k) \end{bmatrix} \quad \text{formula 3}$$

where $r_l(k)$ represents a signal on the k-th subcarrier and obtained by the training frame received on an i-th receiving antenna being processed by the station receiver, l=1, 2; $G_i$ represents a processing gain of the station receiver corresponding to the i-th receiving antenna, and is a power gain;.* represents corresponding multiplication of matrix vectors; $H_{ji}(k)$ represents an equivalent channel matrix of a j-th transmitting antenna in the AP to the i-th receiving antenna in the station; $s_i(k)$ represents a transmission symbol of the l-th transmitting antenna in the AP transmitter on the k-th subcarrier, generally with energy of 1; and $n_i(k)$ represents noise on the station receiver corresponding to the l-th receiving antenna.

The signal power $P_l$ of the training frame received on the l-th receiving antenna is expressed as:

$$P_i = (|H_{1i}|^2 + |H_{2i}|^2) + |n_i|^2 \quad \text{formula 4}$$

$$\approx (|H_{1i}|^2 + |H_{2i}|^2)$$

The station may find out the noise figure NFi corresponding to the signal power Pi of the training frame according to the correspondence between the signal power and the noise figures, and feed back to the AP through CSI.

The AP performs precoding after receiving CSI. The precoding matrix is assumed as Q (a matrix with 2×2 dimension). After the precoding, the data frames are fed to the radio frequency circuit after being received by the two receiving antennas of the station, and afterward are subjected to processing such as analog-to-digital conversion. A signal that has been subjected to the processing by the station receiver and is disposed on the k-th subcarrier may be expressed as:

$$\begin{bmatrix} r'_1(k) \\ r'_2(k) \end{bmatrix} = \begin{bmatrix} G'_1 \\ G'_2 \end{bmatrix} .* \begin{bmatrix} H_{11}(k) & H_{21}(k) \\ H_{12}(k) & H_{22}(k) \end{bmatrix} Q \begin{bmatrix} s_1(k) \\ s_2(k) \end{bmatrix} + \begin{bmatrix} n'_1(k) \\ n'_2(k) \end{bmatrix} \quad \text{formula 5}$$

where $r_i'(k)$ represents a signal on the k-th subcarrier and obtained by the training frame received on the i-th receiving antenna being processed by the station receiver, i=1, 2; $G_i'$ represents a processing gain of the station receiver corresponding to the i-th receiving antenna, and is a power gain;.* represents corresponding multiplication of matrix vectors; $H_{ji}(k)$ represents an equivalent channel matrix of the j-th transmitting antenna in the AP to the i-th receiving antenna in the station; Q represents the precoding matrix; $s_i(k)$ represents a transmission symbol of the i-th transmitting antenna in the AP transmitter on the k-th subcarrier, generally with energy of 1; and $n_i'(k)$ represents noise on the station receiver corresponding to the i-th receiving antenna.

The signal power Pi' of the i-th receiving antenna is expressed as:

$$\begin{bmatrix} P'_1 \\ P'_2 \end{bmatrix} = \begin{bmatrix} \|[H_{11}(k) H_{21}(k)]Q\|^2 \\ \|[H_{12}(k) H_{22}(k)]Q\|^2 \end{bmatrix} + |n_i|^2 \quad \text{formula 6}$$

$$\approx \begin{bmatrix} \|[H_{11}(k) H_{21}(k)]Q\|^2 \\ \|[H_{12}(k) H_{22}(k)]Q\|^2 \end{bmatrix}$$

where $\|\cdot\|^2$ represents a norm, $H_{ji}(k)$ represents the equivalent channel matrix from the j-th transmitting antenna in the AP to the i-th receiving antenna in the station; Q represents the precoding matrix; and $n_i$ represents noise on the station receiver corresponding to the i-th receiving antenna.

Omitting the number k of subcarrier, $$HQ = U * S * V^{-1} * V * S^{-1}/\sqrt{\|VS^{-1}\|^2} \quad \text{formula 7}$$

$$= U/\sqrt{\|VS^{-1}\|^2}$$

where $\|\cdot\|^2$ represents a norm, H represents the equivalent channel matrixes $H_{ji}(k)$, Q represents the precoding matrix; U represents the unitary matrixes U(k), V represents the unitary arrays V(k), and S represents the singular value matrixes S(k).

Combining the formulas 6 and 7, formula 8 is obtained as follows.

$$\begin{bmatrix} P'_1 \\ P'_2 \end{bmatrix} = \begin{bmatrix} \|[H_{11} \ H_{21}]Q\|^2 \\ \|[H_{12} \ H_{22}]Q\|^2 \end{bmatrix} \quad \text{formula 8}$$

$$= \begin{bmatrix} \|[U_{11} \ U_{21}]\|^2 \\ \|[U_{12} \ U_{22}]\|^2 \end{bmatrix} / \sqrt{\|VS^{-1}\|^2}$$

$$= \begin{bmatrix} 1 \\ 1 \end{bmatrix} / \sqrt{\|VS^{-1}\|^2}$$

From the above derivation procedure of a ZF algorithm, the signal power Pi' of the data frames is obtained based on the precoding matrix Q. Those skilled in the art could understand how the signal power Pi' of the data frames is obtained by the precoding matrix Q under other algorithms based on the above derivation of the ZF algorithm. More examples of algorithm are not provided here one by one, and the above example of algorithm does not limit the scope of the present disclosure.

After obtaining the signal power Pi' of the corresponding data frames and the signal power Pi of the training frames in the CSI, the AP may compare whether the two are consistent, for example, assuming $$H' \to SVD \to USV^{-1}$$

$$H' = \begin{bmatrix} 1.4*\sqrt{2}/2 & -0.2*\sqrt{2}/2 \\ 0.2*\sqrt{2}/2 & 1.4*\sqrt{2}/2 \end{bmatrix}, U = \begin{bmatrix} 0.8 & 0.6 \\ -0.6 & 0.8 \end{bmatrix}$$

$$V = \begin{bmatrix} \sqrt{2}/2 & \sqrt{2}/2 \\ -\sqrt{2}/2 & \sqrt{2}/2 \end{bmatrix}, S^{-1} = \begin{bmatrix} 1 & 0 \\ 0 & 1 \end{bmatrix}, Q = \begin{bmatrix} \sqrt{2}/2 & \sqrt{2}/2 \\ -\sqrt{2}/2 & \sqrt{2}/2 \end{bmatrix}$$

the AP is configured to perform the following calculation:

$$\begin{bmatrix} Z_{11} & Z_{21} \\ Z_{12} & Z_{22} \end{bmatrix} = S*V^{-1} = \sqrt{2}/2 * \begin{bmatrix} 1 & -1 \\ 1 & 1 \end{bmatrix}$$

$$\|[Z_{1i}(k) \quad Z_{2i}(k)]\|^2 = 1$$

where Zij is a code name to facilitate expression of the formula in the second line.

The sum of squares of $U/\sqrt{\|VS^{-1}\|^2}$ per line in formula 7 is all 1, thus, the signal power on each receiving antenna does not change, and the data frames may be transmitted according to an initial precoding scheme.

However, if assuming $$H' = \begin{bmatrix} 1 & 7/24 \\ 0 & 25/24 \end{bmatrix}, U = \begin{bmatrix} \sqrt{2}/2 & \sqrt{2}/2 \\ -\sqrt{2}/2 & \sqrt{2}/2 \end{bmatrix}$$

$$V = \begin{bmatrix} 0.8 & 0.6 \\ -0.6 & 0.8 \end{bmatrix}, S^{-1} = \begin{bmatrix} 0.8*\sqrt{2} & 0 \\ 0 & 0.6*\sqrt{2} \end{bmatrix},$$

$$Q = \begin{bmatrix} 0.64*\sqrt{2} & 0.36*\sqrt{2} \\ -0.48*\sqrt{2} & 0.48*\sqrt{2} \end{bmatrix}$$

then, $$\begin{bmatrix} Z_{11} & Z_{21} \\ Z_{12} & Z_{22} \end{bmatrix} = S*V^{-1} = \sqrt{2}/2 * \begin{bmatrix} 1 & -3/4 \\ 1 & 4/3 \end{bmatrix}$$

$$\|[Z_{1i}(k) \quad Z_{2i}(k)]\|^2 = \begin{cases} 1+9/16, & i=1 \\ 1+16/9, & i=2 \end{cases}$$

$$\|[H_{1i}(k) \quad H_{2i}(k)]Q\|^2 = 1$$

That is, the signal power on each receiving antenna changes, and becomes inconsistent, and it is necessary to update the precoding scheme, and then send the data frames.

After the AP receives the CSI, the first figure acquisition circuitry queries the first correspondence according to the signal power Pi of the training frames in the CSI and obtains the first noise figures NFi corresponding to the training frames. After obtaining the signal power Pi' of the data frames through the precoding matrix Q, the first figure acquisition circuitry obtains the second noise figures $NF_0$ corresponding to the data frames according to the first correspondence.

The updating sub-circuitry is configured to update reconstructed matrixes $\tilde{H}_i$' of the equivalent channel matrixes of beam-formed data frames on each subcarrier by formula 9 based on reconstructed matrixes $\tilde{H}_i$, of the equivalent channel matrixes corresponding to the training frames, the noise figures $NF_0$ corresponding to the data frames, and the noise figures NFi corresponding to the training frames, $$\tilde{H}_i' = \tilde{H}_i / \sqrt{NF_0/NF_i}$$ formula 9.

Afterward, the updating sub-circuitry is configured to obtain the updated precoding matrix Q' according to the reconstructed matrixes of the equivalent channel matrixes corresponding to the data frames, where $Q' = \tilde{H}_i'^{-1}$.

Specifically, the updating sub-circuitry includes a first matrix acquisition circuitry, a second matrix acquisition circuitry and a matrix updating circuitry.

The first matrix acquisition circuitry is configured to obtain the reconstructed matrixes $\tilde{H}_i$ of the equivalent channel matrixes $H_i$ corresponding to the plurality of training frames based on the unitary arrays V(k) and the singular value matrixes S(k).

The second matrix acquisition circuitry is configured to obtain the reconstructed matrixes $\tilde{H}_i$ of the equivalent channel matrixes $\tilde{H}_i$' corresponding to the data frames based on the reconstructed matrixes of the equivalent channel matrixes corresponding to the plurality of training frames, the first noise figures $NF_i$, and the second noise figures $NF_0$.

The matrix updating circuitry is configured to update the precoding matrix Q based on the reconstructed matrixes of the equivalent channel matrixes $\tilde{H}_i$' corresponding to the data frames.

An embodiment of the disclosure also provides a beam forming method, including: receiving channel state information, the channel state information including a first correspondence, signal power of a plurality of training frames, and unitary arrays and singular value matrixes, wherein the unitary arrays and the singular value matrixes are associated with equivalent channel matrixes corresponding to the plurality of training frames, the first correspondence includes a correspondence between the signal power and noise figures, and the noise figures are associated with gain values of the receiving and processing circuit in a station; and updating the channel state information in response to meeting a first condition, wherein the first condition includes that the signal power of the plurality of training frames is inconsistent.

The beam forming method further includes obtaining a precoding matrix based on the unitary arrays and the singular value matrixes; and updating the precoding matrix based on the updated channel state information to obtain an updated precoding matrix in response to meeting the first condition.

Said updating the precoding matrix based on the updated channel state information includes: obtaining signal power of data frames based on the precoding matrix; obtaining first noise figures corresponding to the plurality of training frames based on the signal power of the plurality of training frames and the first correspondence; obtaining second noise figures corresponding to the data frames based on the signal power of the data frames and the first correspondence; and updating the precoding matrix based on the first and second noise figures to obtain the updated precoding matrix.

Said updating the precoding matrix based on the first and second noise figures includes: obtaining reconstructed matrixes of the equivalent channel matrixes corresponding to the plurality of training frames based on the unitary arrays and the singular value matrixes; obtaining reconstructed matrixes of equivalent channel matrixes corresponding to the data frames based on the reconstructed matrixes of the equivalent channel matrixes corresponding to the plurality of training frames, the first noise figures, and the second noise figures; and updating the precoding matrix based on the reconstructed matrixes of the equivalent channel matrixes corresponding to the data frames.

The reconstructed matrixes of the equivalent channel matrixes corresponding to the data frames are obtained based on a following formula:

$$\tilde{H}_i' = \tilde{H}_i / \sqrt{NF_0/NF_i}$$

where i represents an i-th receiving antenna in the station, $\tilde{H}_i'$ represents the reconstructed matrix of the equivalent channel matrix corresponding to the corresponding data frame, $\tilde{H}_i$ represents the reconstructed matrix of the equivalent channel matrix corresponding to the corresponding training frame, NFi represents the corresponding first noise figure, and $NF_0$ represents the corresponding second noise figure.

An embodiment of the disclosure also provides a computer-readable storage medium having a computer program stored thereon, wherein the computer program is executed by a processor to perform any one of the methods in the above embodiments.

In some embodiments, the computer-readable storage medium includes a ROM, a RAM, a magnetic disk, or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A station, comprising:
a receiving and processing circuit, configured to obtain signal power of a plurality of training frames on a plurality of receiving antennas by processing the plurality of training frames; and
a combination circuitry, configured to generate channel state information, the channel state information comprising a first correspondence, the signal power of the plurality of training frames, and unitary arrays and singular value matrixes, wherein the unitary arrays and the singular value matrixes are associated with equivalent channel matrixes corresponding to the plurality of training frames, the first correspondence comprises a correspondence between the signal power and noise figures, and the noise figures are associated with gain values of the receiving and processing circuit.

2. The station according to claim 1, wherein the receiving and processing circuit comprises:
a radio frequency circuit, configured to obtain base-band signals corresponding to the plurality of training frames; and
a processing circuitry, configured to obtain the signal power of the plurality of training frames based on the base-band signals and gain values of the radio frequency circuit, wherein the gain values of the radio frequency circuit are associated with the gain values of the receiving and processing circuit.

3. The station according to claim 2, wherein the radio frequency circuit is configured to generate the base-band signals by performing signal amplification and mixing processing on the plurality of training frames.

4. The station according to claim 2, wherein the radio frequency circuit is configured to perform signal amplification on the plurality of training frames based on the gain values of the radio frequency circuit.

5. The station according to claim 2, wherein the radio frequency circuit comprises a low noise amplifier, a mixer, and a variable gain amplifier;
wherein the gain values of the radio frequency circuit are associated with gain values of the low noise amplifier and the variable gain amplifier;
an input terminal of the low noise amplifier is configured to receive the plurality of training frames, and an output terminal of the low noise amplifier is coupled to an input terminal of the mixer;
the mixer is configured to mix signals received at an input terminal of the mixer, and output mixed signals through an output terminal of the mixer; and
an input terminal of the variable gain amplifier is coupled to the output terminal of the mixer, and an output terminal of the variable gain amplifier is configured to output the base-band signals.

6. The station according to claim 2, wherein the processing circuitry is configured to adjust the gain values of the radio frequency circuit.

7. The station according to claim 2, wherein the processing circuitry comprises an analog-to-digital conversion unit, a gain control unit and a power calculation unit;
wherein the analog-to-digital conversion unit is configured to generate digital signals by performing analog-to-digital conversion on the base-band signals;
the gain control unit is configured to adjust the gain values of the radio frequency circuit and transmit the adjusted gain values to the power calculation unit; and
the power calculation unit is configured to calculate power of the digital signals and obtain the signal power of the plurality of training frames based on the power of the digital signals and the gain values of the radio frequency circuit.

8. The station according to claim 1, further comprising a channel estimation and decomposition circuitry;
wherein the channel estimation and decomposition circuitry is configured to decompose the equivalent channel matrixes of the plurality of training frames on each subcarrier to obtain the unitary arrays and the singular value matrixes.

9. A method for feeding back channel state information, being applied to a station which comprises a receiving and processing circuit, and comprising:
obtaining signal power of a plurality of training frames on a plurality of receiving antennas by processing the plurality of training frames; and
generating the channel state information, the channel state information comprising a first correspondence, the signal power of the plurality of training frames, and unitary arrays and singular value matrixes, wherein the unitary arrays and the singular value matrixes are associated with equivalent channel matrixes corresponding to the plurality of training frames, the first correspondence comprises a correspondence between the signal power and noise figures, and the noise figures are associated with gain values of the receiving and processing circuit.

10. The method according to claim 9, wherein the receiving and processing circuit comprises a radio frequency circuit, and said obtaining the signal power of the plurality of training frames on the plurality of receiving antennas by processing the plurality of training frames comprises:
obtaining base-band signals corresponding to the plurality of training frames; and obtaining the signal power of the plurality of training frames based on the base-band signals and gain values of the radio frequency circuit, wherein the gain values of the radio frequency circuit are associated with the gain values of the receiving and processing circuit.

11. The method according to claim 10, wherein the base-band signals are generated by performing signal amplification and mixing processing on the plurality of training frames.

12. The method according to claim 10, wherein signal amplification is performed on the plurality of training frames based on the gain values of the radio frequency circuit.

13. The method according to claim 10, further comprising:
adjusting the gain values of the radio frequency circuit.

14. The method according to claim 10, wherein said obtaining the signal power of the plurality of training frames based on the base-band signals and the gain values of the radio frequency circuit comprises:
generating digital signals by performing digital-to-digital conversion on the base-band signals;
adjusting the gain values of the radio frequency circuit; and
calculating power of the digital signals and obtaining the signal power of the plurality of training frames based on the power of the digital signals and the gain values of the radio frequency circuit.

15. The method according to claim 9, further comprising:
decomposing the equivalent channel matrixes of the plurality of training frames on each subcarrier to obtain the unitary arrays and the singular value matrixes.

16. A non-transitory computer-readable storage medium storing one or more programs, the one or more programs comprising computer instructions, which, when executed by a processor, cause the processor to:
obtain signal power of a plurality of training frames on a plurality of receiving antennas by processing the plurality of training frames; and
generate channel state information, the channel state information comprising a first correspondence, the signal power of the plurality of training frames, and unitary arrays and singular value matrixes, wherein the unitary arrays and the singular value matrixes are associated with equivalent channel matrixes corresponding to the plurality of training frames, the first correspondence comprises a correspondence between the signal power and noise figures, and the noise figures are associated with gain values of a receiving and processing circuit in the processor.

17. The non-transitory computer-readable storage medium according to claim 16, wherein the receiving and processing circuit comprises a radio frequency circuit, and the processor is further caused to:
obtain base-band signals corresponding to the plurality of training frames; and
obtain the signal power of the plurality of training frames based on the base-band signals and gain values of the radio frequency circuit, wherein the gain values of the radio frequency circuit are associated with the gain values of the receiving and processing circuit.

18. The non-transitory computer-readable storage medium according to claim 17, wherein the processor is further caused to perform signal amplification and mixing processing on the plurality of training frames to generate the base-band signals.

19. The non-transitory computer-readable storage medium according to claim 17, wherein the processor is further caused to perform signal amplification on the plurality of training frames based on the gain values of the radio frequency circuit.

20. The non-transitory computer-readable storage medium according to claim 17, wherein the processor is further caused to adjust the gain values of the radio frequency circuit.

* * * * *